(No Model.)
2 Sheets—Sheet 1.

R. J. LEE.
CURRYCOMB.

No. 594,025. Patented Nov. 23, 1897.

Witnesses:
F. G. Fischer
G. Y. Thorpe

Inventor
Robert J. Lee
By Higdon & Higdon,
Attys.

THE NORRIS PETERS CO., PHOTO-LITHO., WASHINGTON, D. C.

(No Model.) 2 Sheets—Sheet 2.
R. J. LEE.
CURRYCOMB.
No. 594,025. Patented Nov. 23, 1897.
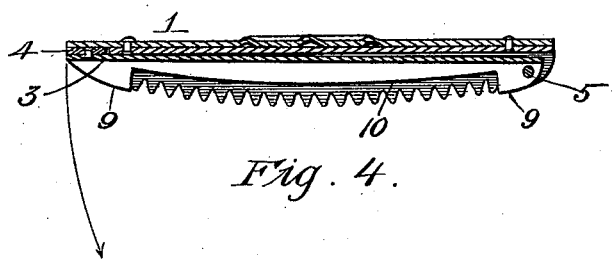
Fig. 4.
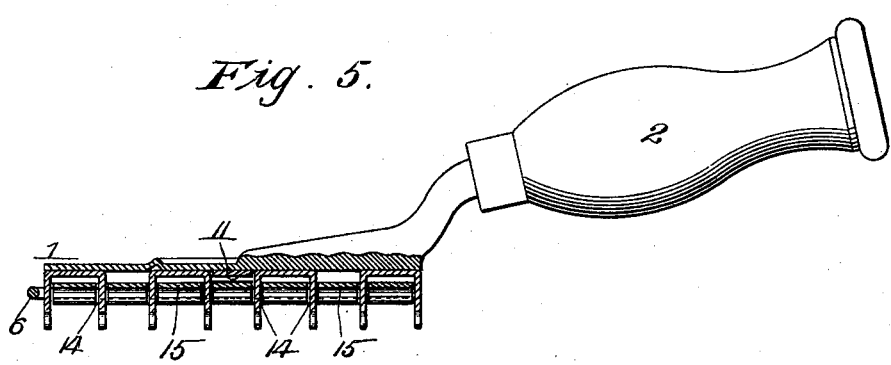
Fig. 5.
Fig. 6.
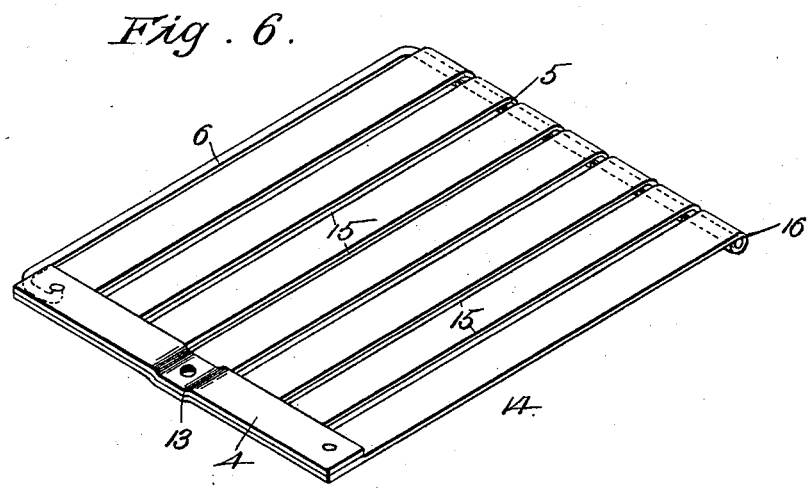
Witnesses: Inventor
F. G. Fischer Robert J. Lee.
By Higdon & Higdon
Attys.
THE NORRIS PETERS CO., PHOTO-LITHO., WASHINGTON, D. C.

UNITED STATES PATENT OFFICE.

ROBERT J. LEE, OF OKLAHOMA, OKLAHOMA TERRITORY.

CURRYCOMB.

SPECIFICATION forming part of Letters Patent No. 594,025, dated November 23, 1897.

Application filed May 15, 1897. Serial No. 636,670. (No model.)

*To all whom it may concern:*

Be it known that I, ROBERT J. LEE, of Oklahoma, county of Oklahoma, and Territory of Oklahoma, have invented certain new and useful Improvements in Currycombs, of which the following is a full, clear, and exact description, reference being had to the accompanying drawings, forming a part thereof.

My invention relates to improvements in currycombs; and it consists in the combination of a currycomb of the usual or any preferred type of construction with attachments whereby the comb may be easily, quickly, and thoroughly cleaned without knocking it against something to dislodge the hair and dirt and whereby it will prevent the animal from being gouged or scratched too hard by the teeth of the comb in the currying operation.

The object of the invention is to produce a currycomb of the character above outlined which is simple, strong, durable, and inexpensive of manufacture.

To this end the invention consists also in certain novel and peculiar features of construction and combinations of parts, as will be hereinafter described and claimed.

In order that the invention may be fully understood, I will proceed to describe it with reference to the accompanying drawings, in which—

Figure 1:
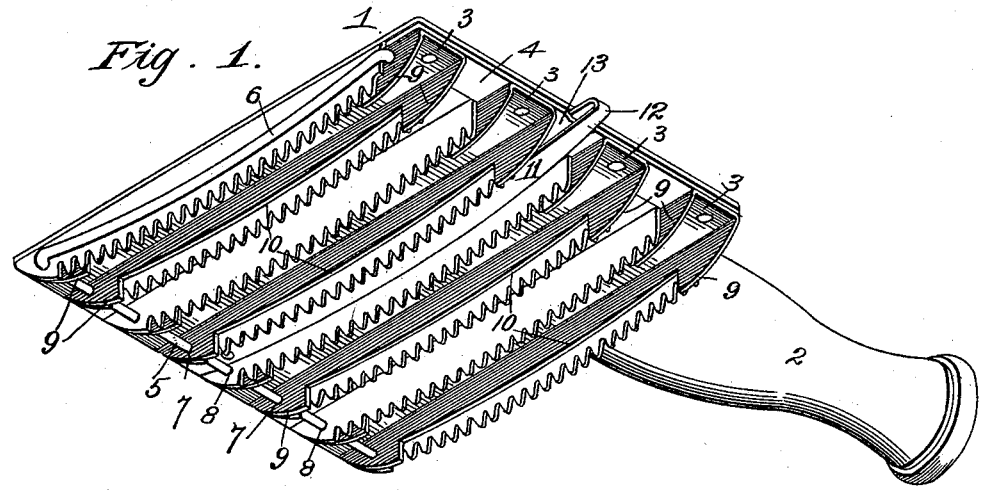
Figure 2:
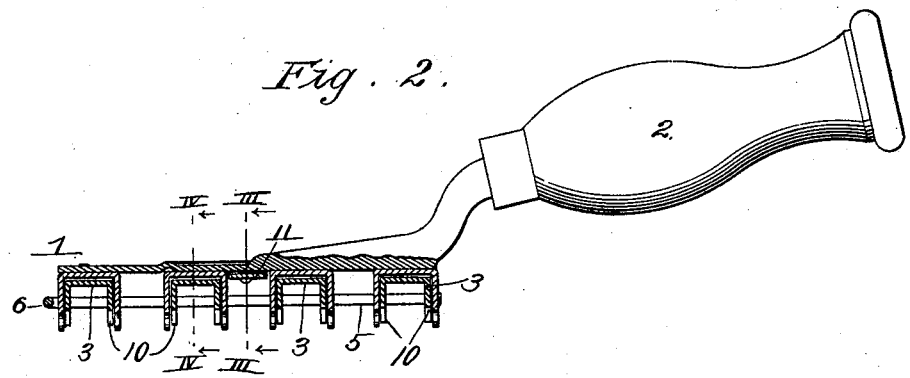
Figure 3:
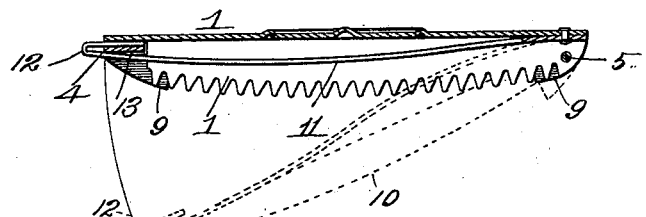

Figure 1 represents a perspective view of a currycomb provided with self-cleaning attachments embodying my invention. Fig. 2 represents a longitudinal section of the same. Fig. 3 represents a cross-section taken on the line III III of Fig. 2. Fig. 4 represents a cross-section taken on the line IV IV of Fig. 2. Fig. 5 represents a longitudinal section showing the cleaning attachments of slightly-modified construction. Fig. 6 represents a detail perspective view of the cleaning attachment.

In the said drawings, 1 designates an ordinary or any preferred type of currycomb, the same being provided with the customary handle 2.

The cleaning attachment is in the form of a rectangular frame of substantially the same contour as the currycomb, and it consists of a series of inverted-U-shaped bars or plates 3, connected at one end by a cross-bar 4 and at their opposite ends by a hinge-rod 5, said hinge-rod by preference being provided with an arm 6, which extends parallel with said series of bars or plates and is connected to the adjacent one at its opposite end in order to stiffen the frame without unduly increasing its cost or weight. Said extension also performs the function of a guide in that it is sufficiently far from the adjacent parallel bar to admit of one row of the currycomb-teeth passing down between them, as and for the purpose which will be hereinafter explained. The substantially U-shaped bars or plates 3 are of width to fit snugly between each alternate set of currycomb-teeth, each set consisting of two rows formed in the arms of a substantially U-shaped plate in the customary manner. Before the hinge-rod is mounted in said frame the latter is fitted squarely up against the under side of the currycomb, with each U-shaped cleaning-plate fitting snugly between a set of the currycomb-teeth, as shown clearly in the drawings, and with the holes 7 of said U-shaped plates in longitudinal alinement or registering with similar holes in the currycomb tooth-plates. The hinge-rod is then slipped through said registering holes and upset or swaged at its end, as a cheap and serviceable mode of securing it, and then the free end of the arm 6 is secured to the opposite end of the adjacent plate of the cleaning attachment, as described, and illustrated in Fig. 1. The opposite ends of the pendent arms of said U-shaped plates 3 are rounded, as shown at 9, and depend to the plane of the pointed end of the teeth. They are about as wide as three or four teeth, so as to bridge or overlap one or more of each row, as shown clearly in Fig. 1, and they are also between such rounded ends recessed or cut away, as shown at 10, so as to expose fully all of the teeth between such points. By this construction it is obvious that the rounded ends of said plates will limit the depth of penetration of the currycomb-teeth, so as to reliably prevent the animal from being gouged or scratched too hard while being cleaned and yet will not interfere in the slightest degree with the thorough cleaning operation. In other words, these rounded ends prevent the teeth from going into the hide, which is painful to the animal and is very common where the naked currycomb is used. In order to hold this cleaning-plate squarely up against the under side of the currycomb and prevent any accidental hinge or swinging movement, I employ the spring 11, which is located between the middle sets of teeth of the comb and is riveted or otherwise suitably secured at one end to the back-plate thereof (see Fig. 3) above the pivot-rod 5, and at its opposite end is bent to form an elongated loop 12, which embraces snugly the cross-bar, preferably bent as shown at 13, and projects beyond the corresponding edge of the back-plate to form a convenient handle whereby the cleaning attachment may be operated and caused to remove the dirt and hair clinging to the teeth of the comb. The tendency of said spring is upward always, and as a consequence it holds the cleaning-plate in the position shown in Fig. 1 while the currying operation takes place and, in fact, at all times, except when the resistance of the spring is overcome, as will be hereinafter described.

In practice the comb is used in the customary manner, and when filled with hair and dirt it is not necessary to pound it against something to dislodge the said dirt and hair or to stop and pick the hair out of the teeth. The operator only has to give it a sharp jerk or twist downward and raise it quickly to cause the attachment to swing downwardly to the position shown in Fig. 3, and thereby dislodge the hair and dirt from the comb. Immediately this is done the spring reacts and returns to its original position, as will be readily understood; or, if desired, the thumb or finger of the other hand may be used to operate the attachment by pressing downwardly upon the projecting or handle end 12 of the spring until the hair and dirt is dislodged. It is then released and springs back to its original position and the comb is again ready for operation. It is preferable, however, to have the spring, while strong enough to hold the cleaning-plate in place, sufficiently sensitive to respond to a slight jerk, jar, or twist of the comb in order to utilize the gravitative tendency and the acquired momentum of the attachment in the cleaning operation. This operation, if it does not invariably remove the hair and dirt, will at least loosen it always, and the air or wind caused by the movement of the hand in sharply striking or jerking the comb downward does the rest, because in practice all the hair and dirt in the comb falls off with each such twist or movement. It will be noticed, as was hereinbefore mentioned, that these cleaning plates or bars of U grooved or channeled formation are arranged only in every alternate opening between the rows of teeth, and as a result only one arm of said bars or plates can act upon a row of teeth to clean it. This is sufficient to keep the comb clean. I have shown, however, a modified form of structure or cleaning plate in Figs. 5 and 6. In this case I employ a plate 14, provided with six slots 15, just wide enough and long enough to play freely upon the rows of teeth which project downwardly therethrough. These slots may be formed by constructing the plate of a single piece of material, as shown, or by employing a number of parallel strips. One end of the plate is coiled to form an eye 16, corresponding to the apertures 7, and the other end is reinforced by the cross-strip 4, which is bent preferably, as shown at 13, like the corresponding part hereinbefore described.

The hinge-rod 5 is adapted to be secured in the eye 16 and in the alined apertures 8 of the currycomb, and the arm 6 of said rod is secured to the opposite end of the cleaning-plate, as shown, or in any other suitable or preferred manner.

The spring 11 will connect the comb and cleaning-plate in substantially the same manner as illustrated and hereinbefore described.

By embracing each row of teeth at opposite sides it is obvious that this style of plate may in some connections be possibly found to work more satisfactorily than the other, but it is only a departure of form and not of principle, and therefore falls within the spirit and scope of the construction first described.

Having thus described the invention, what I claim as new, and desire to secure by Letters Patent, is—

A self-cleaning currycomb, comprising the currycomb proper, a cleaning attachment in the form of a rectangular frame pivoted to the comb and provided with a series of substantially U-shaped bars or plates, which fit between the sets of teeth of the comb and are provided with rounded ends which bridge one or more teeth of each row, and with recesses whereby the remaining teeth are fully exposed, and a spring holding said cleaning attachment yieldingly against the under side of the comb, substantially as and for the purpose described.

In testimony whereof I affix my signature in the presence two witnesses.

ROBERT J. LEE.

Witnesses:
M. W. CARRICO,
J. M. BROGAN.